(12) United States Patent
Faita

(10) Patent No.: US 8,591,719 B2
(45) Date of Patent: Nov. 26, 2013

(54) ELECTROLYSIS CELL FOR HYDROGEN PEROXIDE PRODUCTION AND METHOD OF USE

(75) Inventor: Giuseppe Faita, Novara (IT)

(73) Assignee: Industrie de Nora S.p.A., Milan (IT)

( * ) Notice: Subject to any disclaimer, the term of this patent is extended or adjusted under 35 U.S.C. 154(b) by 1034 days.

(21) Appl. No.: 12/408,180

(22) Filed: Mar. 20, 2009

(65) Prior Publication Data

US 2009/0178931 A1   Jul. 16, 2009

(51) Int. Cl.
*C25B 1/30*   (2006.01)
*C25B 9/10*   (2006.01)

(52) U.S. Cl.
USPC .......................................... 205/466; 204/263

(58) Field of Classification Search
USPC .................. 205/466; 204/263, 632
See application file for complete search history.

(56) References Cited

U.S. PATENT DOCUMENTS

| | | | |
|---|---|---|---|
| 4,455,203 A | | 6/1984 | Stucki |
| 5,643,437 A | * | 7/1997 | Dong et al. .................. 205/466 |
| 5,647,968 A | | 7/1997 | Fraser et al. |
| 6,004,449 A | * | 12/1999 | Vetrovec ........................ 205/466 |
| 6,254,762 B1 | * | 7/2001 | Uno et al. ...................... 205/466 |
| 2003/0019758 A1 | | 1/2003 | Gopal |
| 2004/0007476 A1 | * | 1/2004 | Tennakoon et al. ........... 205/343 |

OTHER PUBLICATIONS

International Search Report dated Feb. 1, 2008 for International Application No. PCT/EP2007/008254.
Written Opinion of the International Searching Authority dated Feb. 1, 2008 for International Application No. PCT/EP2007/008254.
International Preliminary Report on Patentability dated May 12, 2008 for International Application No. PCT/EP2007/008254.
Drogui, et al., "Oxidising and Disinfecting by Hydrogen Peroxide Produced in a Two-Electrode Cell", Water Research, vol. 35, No. 13, Sep. 2001, p. 3235-3241.

* cited by examiner

*Primary Examiner* — Arun S Phasge
(74) *Attorney, Agent, or Firm* — Lucas & Mercanti, LLP

(57) ABSTRACT

An electrolytic cell for the production of hydrogen peroxide with faradic efficiency and a method for the production of highly pure hydrogen peroxide with high faradic efficiency are disclosed. The cell is provided with a separator of high hydraulic permeability and is equipped with an oxygen-fed gas-diffusion cathode and with an anode activated with a catalyst for oxygen evolution. The high faradic efficiency of hydrogen peroxide generation is allowed by the dilution of product hydrogen peroxide by the anolyte crossing the permeable separator, and by keeping the operating temperature at values below 50° C.

21 Claims, 5 Drawing Sheets

ELECTROLYSIS CELL FOR HYDROGEN PEROXIDE PRODUCTION AND METHOD OF USE

CROSS-REFERENCE TO RELATED APPLICATION

This application is a continuation of PCT/EP2007/008254 filed Sep. 21, 2007, that claims the benefit of the priority date of Italian Patent Application No. MI2006A001799 filed, Sep. 21, 2006, the contents of which are herein incorporated by reference in their entirety.

BACKGROUND

Hydrogen peroxide is an oxidant utilised in several applications such as chemical epoxidation processes, waste-water purification, sterilisation of industrial cooling circuits, treatment of electronic integrated circuits, and whitening in textile and paper industries. In these applications, hydrogen peroxide is particularly advantageous as it does not generate any noxious residues, the only final product consisting of water.

The manufacturing process currently employed is known as an anthraquinone process, wherein ethylanthraquinone (or derivatives thereof) dissolved in a suitable organic solvent is sequentially reduced and oxidised, with final generation of a 20% hydrogen peroxide primary solution, subsequently concentrated by distillation. This process is suitable for plants of large capacity, typically 50,000 t/yr or more, the final product being distributed to the different users in tankers or steel containers as 35-50% hydrogen peroxide solution.

Users must, therefore, accept all the inconveniences associated with the decay of stored hydrogen peroxide concentration and with the handling of the tanks. To appreciate the importance of the latter, it will suffice to remind that the sterilisation treatment of an industrial cooling circuit characterised by a 50,000 $m^3/h$ flow-rate and by an injection of as little as 2 parts per million hydrogen peroxide requires about 2500 $m^3/yr$ of 35% solution.

Furthermore, some applications require hydrogen peroxide free of noxious (in the case of waste-water purification) or adsorbable (in the case of integrated circuit treatment) organic impurities. Under the latter standpoint, the use of hydrogen peroxide obtained by means of the anthraquinone process is problematic, since the commercial product may contain organic substances up to 100 ppm as well as non-negligible traces of metals, wherein the organic substances and the metal are respectively released by the process solvent and by the plant machinery which may be subject to some corrosion. The known methods for treating hydrogen peroxide concentrated solutions do not seem to be capable of decreasing the impurities to the levels required by the most critical applications.

It is clear, then, that a process suited to the localised production of highly pure hydrogen peroxide would be received with favour by at least a portion of the users. Processes of this kind are known from the technical literature. Both purely chemical processes based on the direct combination of oxygen and hydrogen on suitable catalysts in the presence of adequate additives at controlled temperature and pressure conditions and electrochemical processes have been proposed. For instance, electrochemical processes capable of producing dissolved hydrogen peroxide at a concentration of 1-3% in alkaline electrolytes, typically 5-10% sodium hydroxide, have been reported.

This process presents an interesting faradic efficiency (expressed as percentage of electric current effectively used for generating hydrogen peroxide), but is also affected by two important drawbacks, one being the presence of an alkaline electrolyte which narrows the number of applications of product hydrogen peroxide. For example, in industrial cooling plants, it is largely preferred the addition of sterilising agents not altering the pH of circulating water, while in the cleaning treatment of integrated circuits the agents employed, which must be easily decomposable without forming secondary products, must not contain additional components except at minimum levels, in the order of magnitude of parts per billion at most.

A second drawback is given by the criticality of operation of gas-diffusion electrodes used for the conversion of oxygen to hydrogen peroxide, when these necessarily porous electrodes are in contact with a liquid phase, in this case the alkaline solution. Since industrial cells are tall, the consequent hydraulic head determines a flooding of the gas-diffusion electrode in its lower portion, which practically stops functioning properly. For this reason, the design of electrolysis cells equipped with gas-diffusion electrodes entails a limitation in the height and consequently in the active surface, lessening the productive capacity to such an extent that an industrial application proves not viable.

Some attempts directed to overcome this inconvenience are disclosed in the technical literature, but for the time being they have not been developed enough to make them suitable for a commercial use.

One way to radically solve the problem of internal flooding of oxygen-diffusion electrodes has been proposed in which a cell subdivided by an ionomer membrane into two compartments, cathodic and anodic, respectively fed with oxygen and with water. The ionomer membrane is provided with two electrodes, cathode and anode, in the form of catalytic porous films, respectively, for the reduction of oxygen to hydrogen peroxide on the cathode side and for evolving oxygen from water on the anode side. The oxygen evolution reaction releases protons which migrate in a hydrated form across the ionomer membrane and react with oxygen in the cathode porous film generating hydrogen peroxide. The membrane isolates the cathode porous film from the hydraulic head established by the water present in the anodic compartment. Flooding of the porous cathode is hence no longer possible, so that the electrolysis cell may be designed of suitable height for industrial applications. The problem with this type of process is given by the faradic efficiency of hydrogen peroxide production which is around 3-3.5%, with final concentrations of 1 to 1.5%. Such a modest result probably derives from the lack of substantial dilution of generated hydrogen peroxide which is conversely a peculiar feature of the alkaline-type process. In fact, in these processes hydrogen peroxide is diluted by the proton hydration water alone, since water diffusion across currently employed ionomer membranes is not significant. In a simplified calculation, assuming a faradic efficiency of 50% and four water molecules constituting the proton hydration shell, a theoretical hydrogen peroxide concentration around 10% is obtained. At this concentration level, hydrogen peroxide is probably affected by a substantial decomposition rate inside the cathode film, certainly accelerated by traces of even minimal amounts of some elements, in particular transition elements and compounds thereof.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, the invention comprises an electrolytic cell for the production of hydrogen peroxide with faradic efficiency. The invention further comprises a method for the production of highly pure hydrogen peroxide with high faradic efficiency.

To the accomplishment of the foregoing and related ends, the following description and drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

BRIEF DESCRIPTION OF THE DRAWING FIGURES

The invention will be described hereafter making reference to the following explicative drawings.

DESCRIPTION

Figure 1:
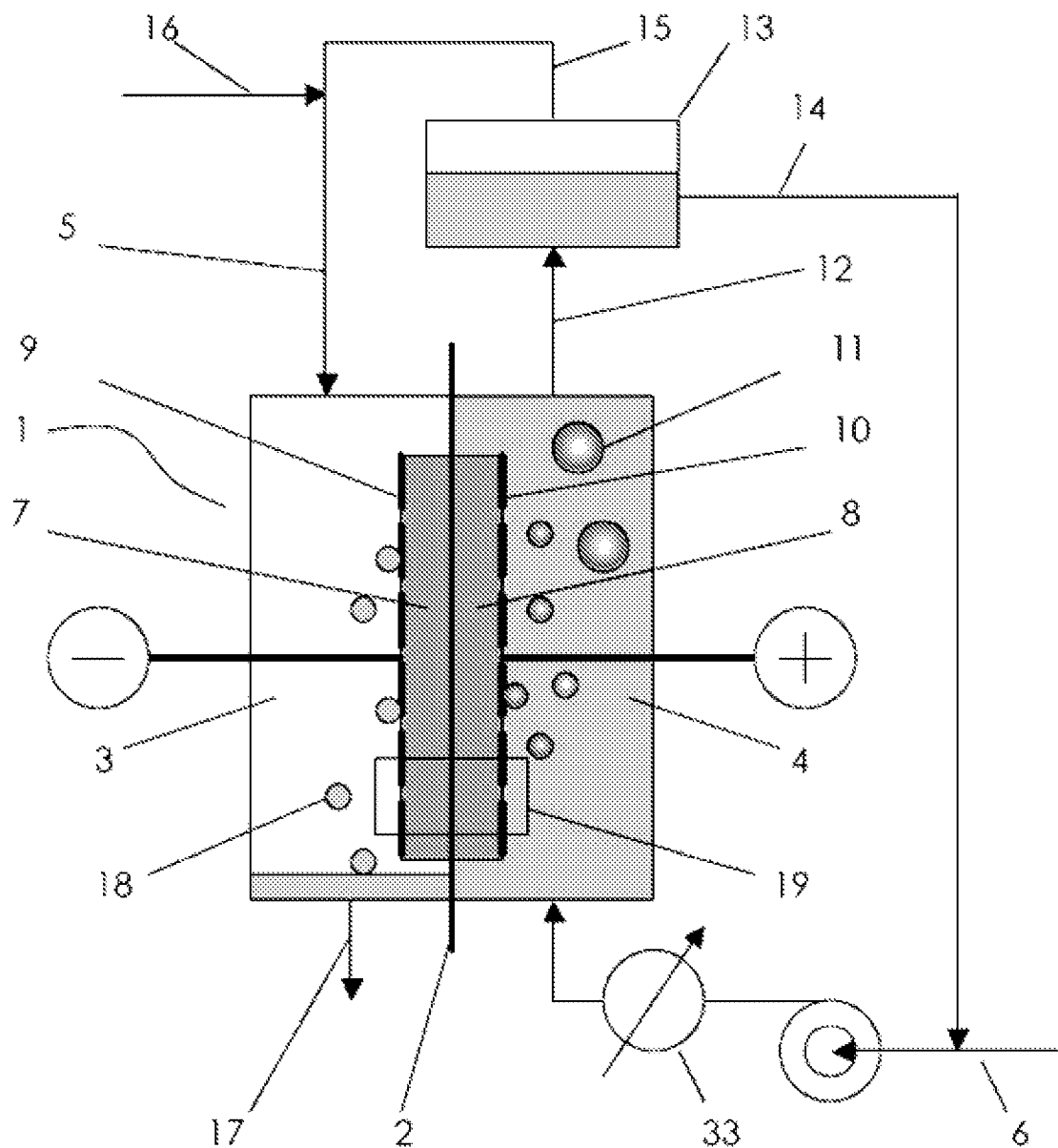
FIG. 1 illustrates a first embodiment of the electrolysis cell of the invention, provided with gas-diffusion cathode and anode applied on the two surfaces of an ion-exchange membrane of high hydraulic permeability.

In a first aspect, the invention relates to an electrolytic cell for the production of hydrogen peroxide subdivided by a separator characterised by high hydraulic permeability into two compartments, cathodic and anodic, the anodic compartment provided with means for feeding an anolyte comprising deionised water or an aqueous electrolytic solution, the cathodic compartment comprising means for feeding oxygen and a porous cathode comprising a catalytic material applied to one surface of the separator for reducing oxygen to hydrogen peroxide. By oxygen feed it is intended, herein and in the following, a feed of either pure oxygen or of a gaseous mixture containing oxygen, optionally consisting of air.

The hydraulic permeability of the separator is such that it allows the passage of an anolyte flow, that is water or aqueous electrolytic solution fed to the anodic compartment, at a flow-rate of 10 to 100 $l/h.m^2$.

In one embodiment, the separator comprises one or more of a microporous ion-exchange membrane, or a hydrophilic microporous diaphragm with no ionic conductivity.

According to one embodiment of the invention, the anolyte is an aqueous solution containing at least one acid comprising one or more of sulphuric, phosphoric, perchloric and acetic acid. In an alternative embodiment, the anolyte comprises an aqueous solution containing at least one basic compound comprising one or more of sodium, potassium and lithium hydroxides and potassium carbonate.

In one embodiment, the gas-diffusion cathode comprises a porous catalytic film containing micro-regions of hydrophobic nature stably available for oxygen diffusion and hydrophilic micro-regions stably available for the withdrawal of water mixed with the product hydrogen peroxide.

On the surface opposite the one having the gas-diffusion cathode applied thereto, the separator is equipped with an anode, optionally in the form of gas-diffusion anode, comprising a hydrophilic porous film provided with catalytic material for oxygen evolution. In one alternative embodiment, the anodic compartment of the cell contains an anode comprising a support in form of punched or expanded sheet, provided with a coating comprising a catalytic material for oxygen evolution.

The cathode catalyst for the reduction of oxygen to hydrogen comprises one or more of gold, palladium and alloys thereof, graphite and macrocyclic metallocomplexes, for example metalloporphyrins, optionally dispersed on a conductive support. Such materials, with particular reference to graphite and to the optional conductive support, must be free of components capable of decomposing hydrogen peroxide, as known in the art.

The anode catalyst for oxygen evolution comprises one or more of the platinum group metals, alloys and oxides thereof.

In one embodiment of the invention, the anolyte comprises one or more hydrogen peroxide stabilising agents.

As regards the process conditions, the cell temperature is kept, for example, below 50° C., and in one embodiment, below 30° C., by controlling the anolyte temperature. Oxygen evolved in the anodic compartment may be advantageously recycled to the cathodic compartment together with an at least equal amount of oxygen coming from an external source, optionally ambient air. From the cathodic compartment of the cell of the invention it may be thus advantageously obtained a hydrogen peroxide solution of 1 to 5% by weight concentration, with a faradic efficiency not lower than 50%.

FIG. 1 illustrates a side-view of a cell 1 subdivided by a separator 2 into two compartments, cathodic 3 and anodic 4, respectively fed with oxygen 5 and an anolyte 6, either comprising deionised water or of an aqueous solution containing one or more electrolytes. The separator 2 is characterised by a high permeability to water contained in the anolyte present in the anodic compartment 4. In the embodiment of FIG. 1, the separator 2 is a membrane comprising an ion-conducting polymer, equipped on the two surfaces facing the cathodic compartment 3 and the anodic compartment 4 respectively with a gas-diffusion cathode 7 comprising a catalytic material for oxygen reduction to hydrogen peroxide and with an anode 8 comprising a catalytic material for the evolution of oxygen from water. Two electric current distributors 9 and 10, for example in the form of punched sheets, expanded sheets or conductive meshes, are connected to the negative and positive poles of a rectifier (not shown) and are kept in intimate contact with the cathode 7 and the anode 8. The ion-conductive membrane comprises, for example, a perfluorinated-type polymer material, capable of withstanding the corrosive action of hydrogen peroxide and of radicals generated as intermediate products in the reactions of generation and decomposition thereof. Membranes of such kind are, for example, commercialised by the DuPont Company, USA under the trade-mark Nafion®.

The gas-diffusion cathode 7 comprises a porous film characterised by a controlled ratio of hydrophilicity to hydrophobicity, more particularly by a bimodal structure resulting from a multiplicity of homogeneously distributed substantially hydrophilic micro-regions and substantially hydrophobic micro-regions, whose overall volume ratio is, in one embodiment, from 0.5 to 2, for example, close to 1. By the term micro-region it is herein intended to define elementary volumes which constitute the porous film, having dimensions indicatively ranging from 1 to 100 μm. The micro-regions comprise pores with an average diameter preferably ranging from 0.01 to 1 μm.

The bimodal structure of the cathode porous film may be obtained according to the prior art by suitably adjusting the relative amounts of the constituents, for example, the catalytic material, hydrophilic material and hydrophobic material, the latter two also acting as binders for the whole assembly. Procedures of such kind are, for instance, disclosed in US 2003/0068544, U.S. Pat. No. 5,998,058 and EP 0 110 491.

Hydrophilic and hydrophobic materials, respectively, comprise, for example, perfluorinated ionomers identical or similar to those used for the manufacturing of ionomer membranes and fluorinated polymers, for example, polytetrafluoroethylene.

The catalytic material for the reduction of oxygen to hydrogen peroxide may comprise one or more of gold, palladium and alloys thereof, graphite and macrocyclic metallocomplexes, for instance metalloporphyrins, optionally dispersed on a conductive support, for instance carbon with various degrees of graphitisation. The conductive supports are used in the form of micropowders and are characterised by being free of components, for example, transition elements and compounds thereof, capable of decomposing hydrogen peroxide. By the term micropowders it is herein intended powders having average size of about 0.01 to 1 μm.

The anode 8 comprises, in one embodiment, a gas-diffusion anode comprising a porous film having an entirely and substantially hydrophilic structure, applied to the surface of the separator 2 opposite the cathode according to procedures known in the art and based on the use of mixtures of catalytic materials with hydrophilic materials in a suitable ratio. As for the case of the cathodic film, also in this case the hydrophilic material comprises, for example, perfluorinated ionomers similar to those used for the manufacturing of ion-exchange membranes. The use of this type of ionomer has the double advantage of allowing to simultaneously achieve a high level of hydrophilicity in the anodic film and an optimum adhesion to the ionomer membrane.

The catalytic material of the anodic film may comprise one or more of the platinum group metals, for example, ruthenium, platinum, iridium, alloys thereof and relative oxides. The catalytic material is employed in the form of micropowders, as such or deposited on suitable conductive supports, chemically inert in the strongly oxidising conditions typical of oxygen evolution. While active carbons, even at a high degree of graphitisation, would be severely corroded at the indicated process conditions and hence cannot be taken into consideration, conductive oxides such as non-stoichiometric titanium and tantalum oxides and mixed titanium, niobium and tantalum oxides are suitable.

During the operation of the cell of FIG. 1, the anodic compartment 4 is fed with deionised water 6—whose temperature is optionally regulated by heat exchanger 33—part of which reacts on the catalytic sites of the anodic porous film 8, giving rise to oxygen evolution 11 and release of protons which migrate across the membrane together with the water of their hydration shell. The mixture 12 consisting of product oxygen 11 and residual water is sent to the separator 13. The degassed water 14 is recycled to the cell 1 added with a fresh water feed 6, while separated oxygen 15 is fed to the cathodic compartment 3 together with an equal amount of oxygen coming from an external source 16, for instance air conveyed by a fan or compressor or an oxygen-containing flow produced by an air-enrichment device (not shown in FIG. 1). Oxygen flowing in the cathodic compartment 3 diffuses across the porosity of the hydrophobic micro-regions of cathode film 7 and, in combination with the protons migrating across the membrane, is reduced to hydrogen peroxide on the active sites of catalytic micropowders. Hydrogen peroxide thus produced, diluted by water transported by protons as a hydration shell and more importantly by water diffusing across the membrane, is withdrawn from the bottom part 17 of the cell cathodic compartment. The hydrogen peroxide dilution with diffused water illustrates a feature of the invention. In fact, if hydrogen peroxide were only diluted by the water transported by protons, as occurs in the processes known in the art, its concentration would be indicatively 10-15%, at which level the decomposition rate inside the cathode film, catalysed by the unavoidable traces of certain impurities, would be certainly high with a consequent sudden decay of the effective faradic efficiency, as known in the art. In the presence of the dilution effect induced by water diffusion across the membrane, the initial concentration of hydrogen peroxide can be remarkably lower than the above indicated value. In particular, it was found that such concentration may be reduced below 5%, for example, within the range 1-3% with a faradic efficiency equal to or higher than 50%.

In order to achieve the above indicated concentrations, with the cell operated at a current density, for example, of 1-2 $kA/m^2$, the tests carried out demonstrated that the ionomer membrane in accordance with the invention should have a water permeability of, in one embodiment, 5 to 100 $l/h.m^2$, and in one embodiment, 10 to 50 $l/h.m^2$. Such values of permeability can be achieved, for instance, with perfluorinated ionomer membranes having an equivalent weight below 900, and in one embodiment, below 700, and a high cross-linking degree directed to ensure their stability in the presence of water or aqueous solutions. Some methods for the production of this type of membranes are known in the art, for instance, according to the disclosure of EP 1 238 999. A similar membrane, preferably 30 to 200 μm thick, may be advantageously provided with an internal reinforcement directed to increase its mechanical resistance—particularly in the presence of pressure differentials across its two faces—and to improve its handling and in general all the operations associated with its installation in the cell. The reinforcement comprises one or more of fibres dispersed in the polymer bulk, micro-cloths, (for instance expanded micro-cloths), and cloths inserted within the thickness of the membrane.

It was also found that the desired permeability values are also obtained with the optional co-operation of a pressure differential across the first and the second surface of the membrane, wherein such differential is at least 0.1 bar, and in one embodiment, 0.3 to 1 bar (pressure in the anodic compartment 4 higher than the pressure in the cathodic compartment 3).

Water diffusion from the anodic compartment 4 to the cathodic compartment 3 is affected, besides the ionomer membrane's own permeability, also by the characteristics of hydrophilicity and hydrophobicity of the cathode 7 and anode 8 porous films. In particular, it was observed that the highest water diffusion rates are achieved when the anode porous film 8 is substantially hydrophilic across the whole structure. On the contrary, it was verified that such structure is unfit for the cathode porous film 7 since it would lead to a massive internal flooding, preventing the diffusion of oxygen to the catalyst active sites, which would hamper the cell operation. On the other hand, it was also found that a completely hydrophobic structure hinders water diffusion from the membrane to a substantial extent. To avoid these inconveniences, the structure of porous film 7 must simultaneously comprise, as indicated above, distributed hydrophobic micro-regions homogeneously arranged side-by-side to the corresponding hydrophilic micro-regions. This bimodal structure of the cathode porous film is essential to ensure stable functioning conditions wherein hydrophilic porous regions allow the mixture 18 formed by water coming from separator 2 and hydrogen peroxide produced on the catalytic active sites to be easily discharged from the surface of the cathode film facing the surface in contact with separator 2, while hydrophobic regions free of liquid water permit the quick diffusion of oxygen to the catalytic material active sites. In particular it could be verified that the optimum functioning conditions are achieved when the volumetric ratio of hydrophilic to hydrophobic regions is approximately 1.

Figure 2:
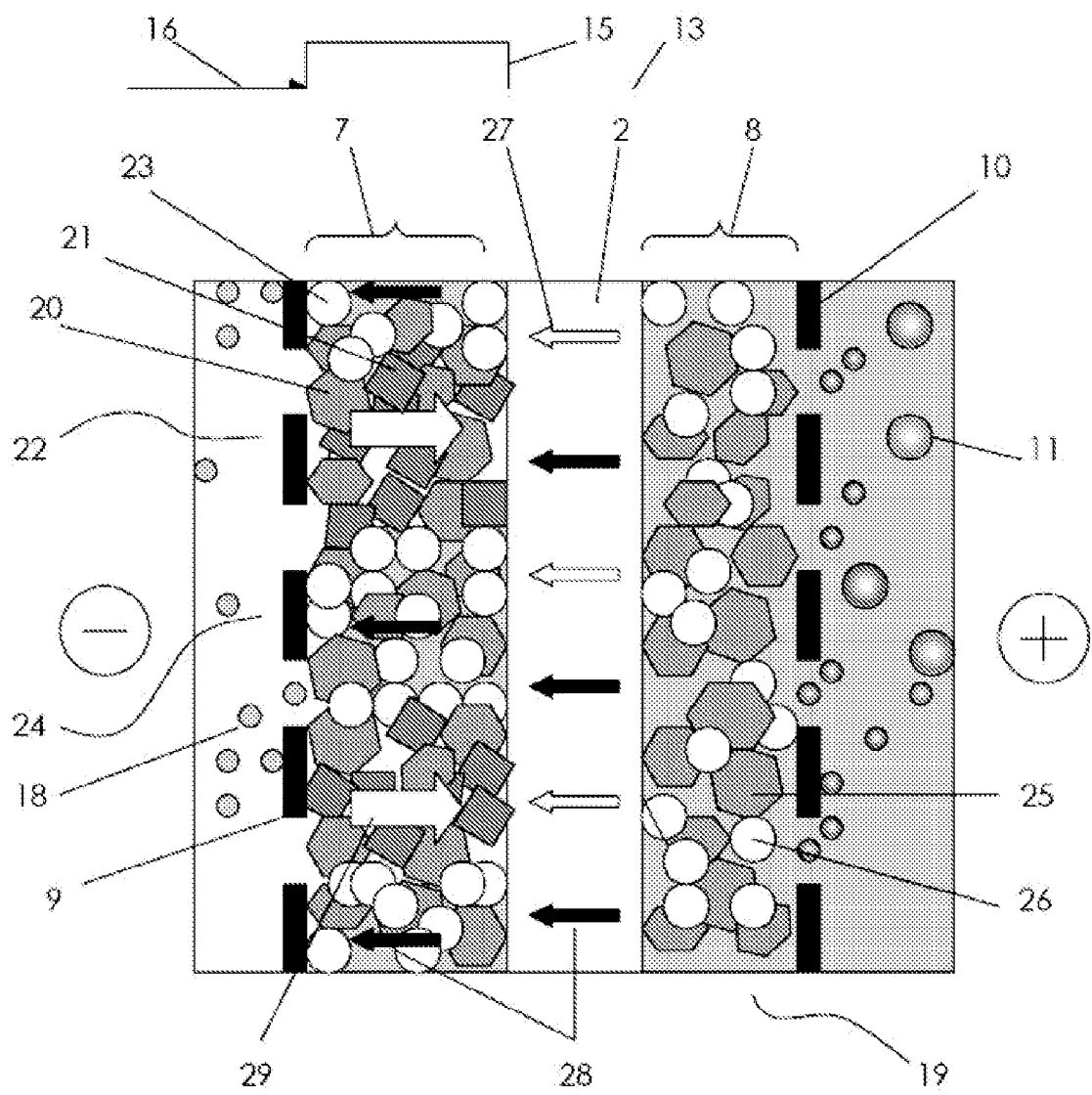
FIG. 2 illustrates a magnification of a detail of FIG. 1.

This microstructure is illustrated in FIG. 2, which represents the magnification of detail 19 of FIG. 1, wherein 20 identifies the catalytic micropowder for reducing oxygen to hydrogen peroxide, marked with hexagons for an easier understanding, 21 the micropowder of hydrophobic nature (squares), for example, polytetrafluoroethylene, distributed so as to create hydrophobic micro-regions 22, 23 the micropowder of hydrophilic nature (circles), for example, an ionomer identical or similar to the one used for the manufacturing of the membrane, for example, a perfluorinated ionomer, substantially localised in the hydrophilic regions 24, 25 the catalytic micropowder for oxygen evolution from water (hexagons), 26 the hydrophilic micropowder (circles), again for example, an ionomer identical or similar to the one used for the manufacturing of the membrane, for example, a perfluorinated ionomer, homogeneously distributed to make the whole anode porous film hydrophilic, 21 the oxygen bubbles evolved from the anode porous film. The porosity both of the hydrophilic and hydrophobic micro-regions of the cathode film, and of the whole anode film, consists of the three-dimensional network of the interspaces between the various micropowders. The components of FIG. 2 in common with those of FIG. 1 are identified by the same reference numerals, while the migration of the hydrated protons and the flow of water across the membrane and the oxygen diffusion across the cathode porous film are respectively indicated by arrows 27, 28, and 29.

The above illustrated process may be modified by replacing the deionised water feed with an aqueous solution feed containing one or more electrolytes, comprising one or more of sulphuric, phosphoric, perchloric and acetic acid, optionally added with additional electrolytes, such as, for instance, sodium or potassium salts of the same acids.

Aqueous solutions containing acids, and optionally salts thereof, are characterised by a substantial electrical conductivity. Therefore, this type of feed allows resorting to an alternative design of anode comprising one or more of punched sheets, expanded sheets or meshes placed in contact with the second surface of the membrane, or at a certain distance therefrom, for example, not exceeding 3 mm. The testing has demonstrated that a similar constructive solution presents higher operating voltages, but also that it is characterised by a higher simplicity and by reduced manufacturing costs. The construction material of sheets and meshes, having to be electrically conductive and resistant to the aggressiveness of the aqueous solutions fed to the anodic compartment, comprises a metal comprising one or more of titanium, zirconium, niobium, tantalum, alloys thereof and nickel alloys of high chromium content. Sheets and meshes are further provided with a catalytic coating for the evolution of oxygen from water in acidic environment as known in the art, comprising one or more of platinum group metals, alloys and oxides thereof, for example, iridium oxide or iridium and ruthenium mixed oxide optionally added with titanium, tantalum or niobium oxide.

Figure 3:
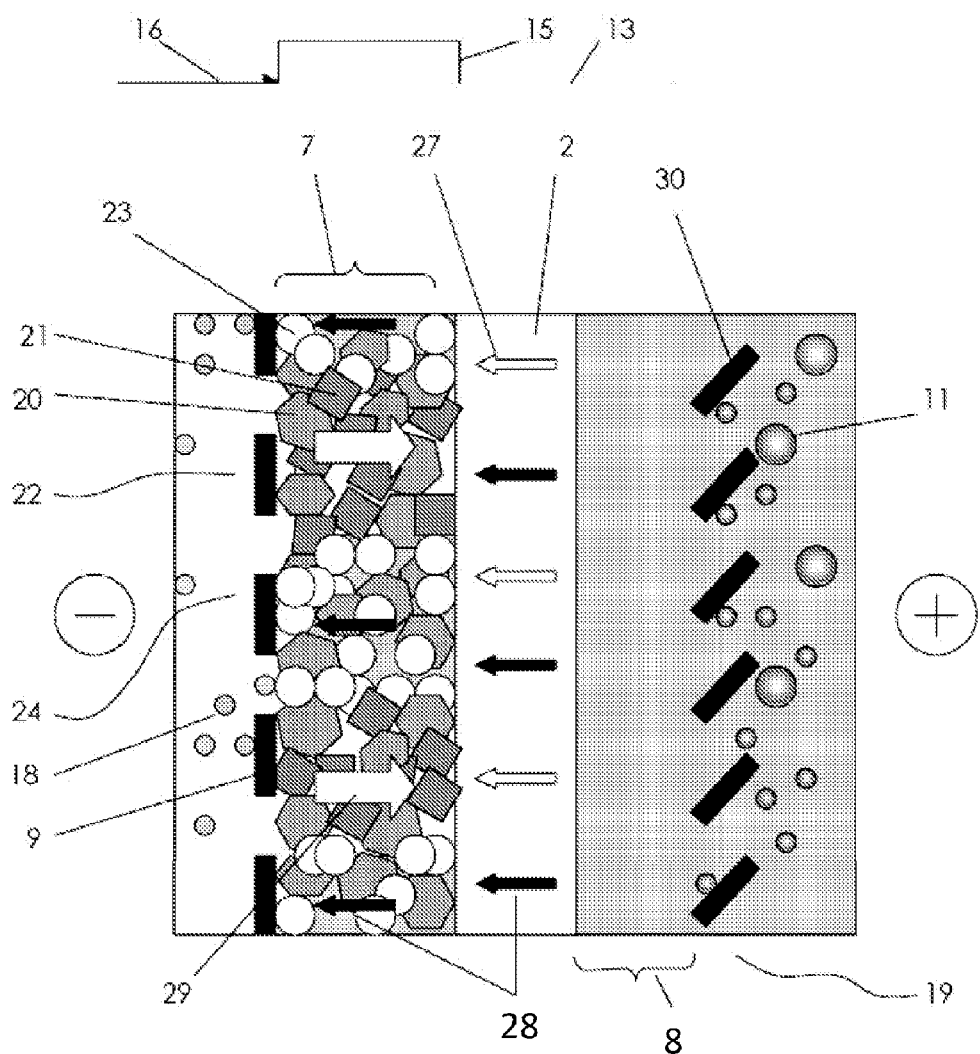
FIG. 3 illustrates a detail, analogous to that of FIG. 2, related to a second embodiment of the cell of the invention, wherein the anodic compartment is equipped with an anode comprising an expanded sheet provided with a catalytic coating for oxygen evolution and the anolyte is an electrolytic solution.

The second cell embodiment is shown in FIG. 3 which illustrates a modification of the detail illustrated in FIG. 2. The components in common with those of FIG. 2 are identified by the same reference numerals while 30 illustrates the side-view of an expanded sheet in a parallel position to the membrane at a distance 31.

It was verified that the optional presence of a microporosity in the ionomer membrane of the cell of FIGS. 1, 2 and 3 does not raise any particular concern associated with its functioning, since the only gas present in the two compartments, cathodic and anodic, is oxygen, the typical hydrophilicity of the ionomer material favouring the penetration of water or aqueous solution contained in the anodic compartment in the micropores, with a substantial sealing effect. This feature facilitates the manufacturing of the required ionomer membranes even at a very reduced thickness, differently to what happen, for example, with ionomer membranes for fuel cells, wherein the gases in the cathodic and anodic compartment are oxygen and hydrogen and wherein liquid water is not always present.

Conversely, it was found that for the process of the invention, microporosity may prove an important property of the membrane allowing to obtain more easily water diffusion flows up to 100 l/h.m$^2$ with modest pressure differentials, even lower than 0.1 bar, as required in order to obtain dilute and stable hydrogen peroxide solutions. Microporous membranes of this kind are disclosed in EP 1 238 999. Microporosity can also be obtained by embedding suitable fillers in the ionomer membranes in the form of microporous particles of hydrophilic materials, such as, for instance, several types of oxides, for example silica, alumina, titanium dioxide and the like, as widely known from the technical literature which also discloses several methods of production.

Figure 4:
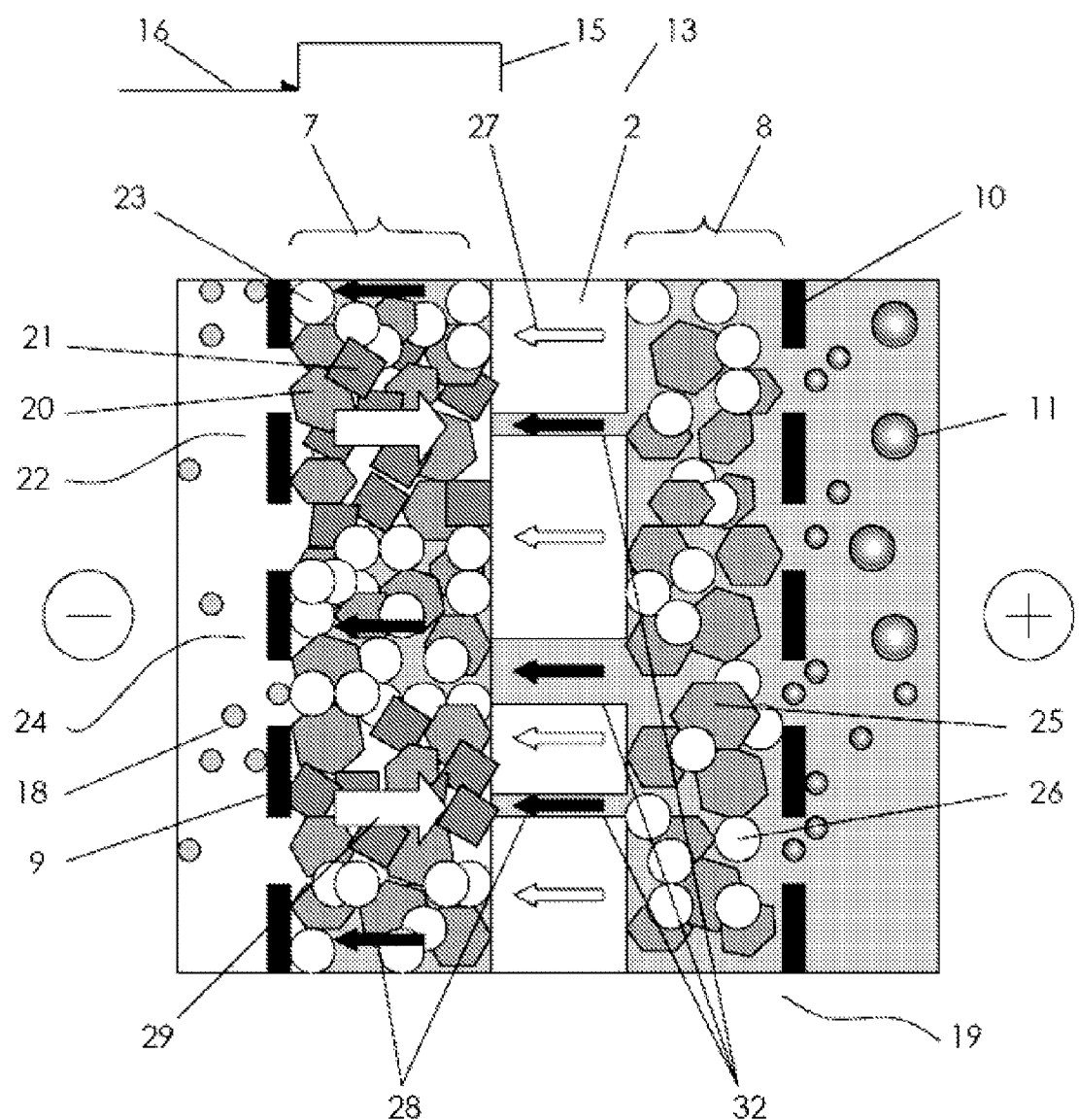
FIG. 4 illustrates a detail, analogous to that of FIG. 2, related to a third embodiment of the cell of the invention, wherein the cell is provided with a microporous membrane and with gas-diffusion cathode and anode and the anolyte is deionised water.

FIG. 4 represents the detail, analogous to that illustrated in FIG. 2, related to a third embodiment of the cell fed with deionised water with a modification of the microporous nature of the ionomer membrane, wherein 32 identifies the micropores, the common elements with FIG. 2 being indicated by the same numerals. In the present context, micropores indicate the pores crossing the whole thickness of the membrane characterised by average diameters of 0.01 to 1 µm. This kind of microporosity proves necessary to avoid that the effect of pressure existing in the anodic compartment determines some sort of flooding of the cathode porous film, detrimental for the regular functioning.

In FIG. 4 there is evidenced the localisation of water diffusion and proton migration in distinct areas. In particular, the water flow 28 is essentially localised within the microporosity, while conversely, due to the poor electrical conductivity of deionised water, hydrated proton migration 27 is necessarily limited to the bulk of the ionomer membrane.

Figure 5:
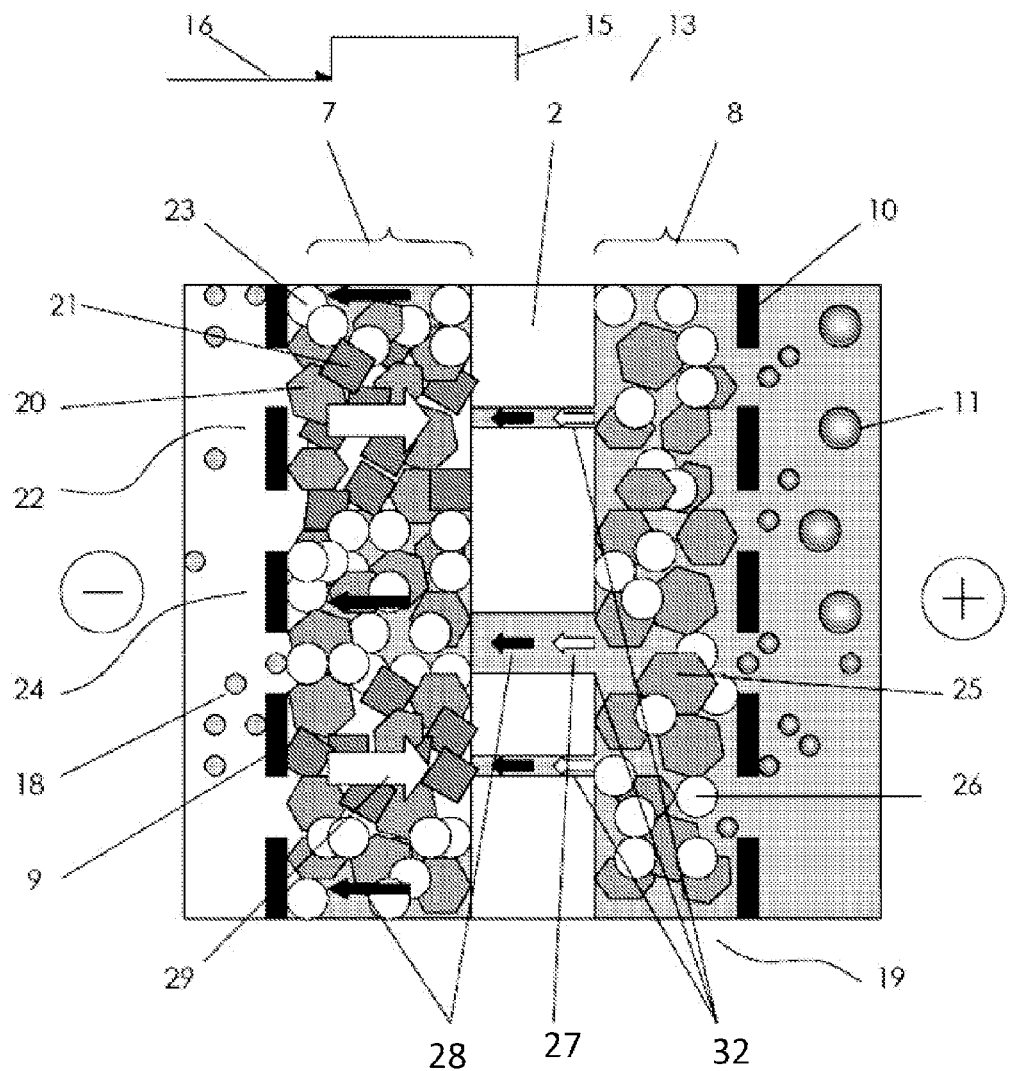
FIG. 5 illustrates a detail, analogous to that of FIG. 2, related to a fourth embodiment of the cell of the invention, wherein the cell is provided with a microporous membrane and with gas-diffusion cathode and anode and the anolyte is an electrolytic solution.

When the anodic compartment is fed with aqueous solutions containing electrolytes, for instance, comprising one or more of sulphuric, phosphoric, perchloric and acetic acid, optionally containing the sodium and potassium corresponding salts, at a concentration indicatively equal to or higher than 0.1 M, and thus characterised by a substantial electrical conductivity, also proton migration 27 turns out to be localised within the micropores, as illustrated in FIG. 5. In this situation, it was verified that the separator may advantageously comprise a microporous diaphragm, made of a chemically stable material in the operating conditions but lacking any ionic conductivity, comprising one or more of polysulphones, polyetherketones, polyetheretherketones, polybenzimidazoles and other chemically stable polymers, provided they are made hydrophilic, for instance, by suitable additives.

Feeding the anodic compartment with an aqueous solution allows making use also with cells equipped with a microporous separator (ionomer membrane or diaphragm) of the above seen anode design represented by punched sheets, expanded sheets or meshes put in contact with the second surface of the membrane or spaced therefrom, preferably with a gap not higher than 3 mm.

It is apparent that the aqueous solution flow across the microporosity of the separator (membrane or diaphragm) implies that the product hydrogen peroxide also contains the same electrolyte present in the aqueous solution. Such presence is acceptable for applications in the field of cooling circuit sterilisation or waste-water treatment, while not being compatible with superficial cleaning treatments of electronic integrated circuits. In the latter case, the cell anodic compartment must be compulsorily fed with totally deionised water, and it is, therefore, necessary to make use of different embodiments of the invention.

It was found that satisfactory results in terms of final hydrogen peroxide concentration and faradic efficiency are also obtainable when the aqueous solution fed to the anodic compartment of the cell is of the alkaline type, for example, containing sodium, potassium or lithium hydroxide or potassium carbonate.

The water or aqueous solution fed to the cell anodic compartment may be added with hydrogen peroxide-stabilising agents, provided the latter are compatible with the subsequent application, in order to further minimise the decomposition rate of the dilute product solution. Some stabilising agents, as indicated in Encyclopaedia of Chemical Technology, Kirk-Othmer, Vol. 11, comprise, for example, sodium pyrophosphate, colloidal tin oxide, alkaline silicates and chelating compounds such as hydroxyquinoline and salts of ethylendi-aminotetraacetic acid.

It was finally found that an additional stabilisation of hydrogen peroxide solutions produced by the method of the invention is obtainable by controlling the operating temperature typically below 50° C., and in one embodiment below 30° C., for instance by means of heat exchanger 33 (FIG. 1) inserted on the feed-stream of cell 1.

Although the disclosure has been shown and described with respect to one or more embodiments and/or implementations, equivalent alterations and/or modifications will occur to others skilled in the art based upon a reading and understanding of this specification. The disclosure is intended to include all such modifications and alterations and is limited only by the scope of the following claims. In addition, while a particular feature may have been disclosed with respect to only one of several embodiments and/or implementations, such feature may be combined with one or more other features of the other embodiments and/or implementations as may be desired and/or advantageous for any given or particular application. Furthermore, to the extent that the terms "includes", "having", "has", "with", or variants thereof are used in either the detailed description or the claims, such terms are intended to be inclusive in a manner similar to the term "comprising."

The invention claimed is:

1. An electrolysis cell for hydrogen peroxide production comprising:
   a cathodic compartment, the cathodic compartment comprising:
      a gas-diffusion cathode comprising a catalytic porous film for the reduction of oxygen to hydrogen peroxide,
      means for feeding oxygen, and
      a bottom part adapted to withdraw a solution of hydrogen peroxide of 1 to 5% by weight concentration;
   an anodic compartment, the anodic compartment comprising:
      an anode equipped with a catalyst for oxygen evolution, and
      means for feeding an aqueous anolyte; and
   a membrane subdividing the cell into the cathodic compartment and the anodic compartment, the membrane being an ionomer membrane having an equivalent weight below 700 and provided with a first surface facing the cathodic compartment and a second surface facing the anodic compartment,
   wherein, the catalytic porous film of the gas-diffusion cathode comprises at least one hydrophobic material, at least one hydrophilic material and at least one catalytic material and has a bimodal internal structure comprising hydrophobic micro-regions and hydrophilic micro-regions.

2. The cell of claim 1, the hydrophobic and hydrophilic micro-regions comprising pores with an average diameter of 0.01 to 1 μm.

3. The cell of claim 1, the hydrophobic and hydrophilic micro-regions have average dimensions of 1 to 100 μm.

4. The cell of claim 1, the volumetric ratio of the hydrophobic micro-regions and the hydrophilic micro-regions is 0.5 to 2.

5. The cell of claim 1, the hydrophilic material comprising an ion-conductive perfluorinated polymer.

6. The cell of claim 1, the catalytic material comprising one or more of gold, palladium and alloys thereof, graphite and macrocyclic metallocomplexes.

7. The cell of claim 6, the catalytic material is dispersed on a conductive support free of components capable of decomposing hydrogen peroxide.

8. The cell of claim 1, the anode comprising a gas-diffusion anode comprising a hydrophilic porous film applied to the second surface of the membrane equipped with a catalyst for oxygen evolution.

9. The cell of claim 1, the anode comprising a support in the form of a conductive punched sheet, expanded sheet or mesh equipped with a catalytic coating for oxygen evolution.

10. The cell of claim 1, the anodic catalyst for oxygen evolution comprising one or more of platinum group metals, alloys and oxides thereof.

11. Process for the production of an aqueous solution of hydrogen peroxide of 1 to 5% by weight concentration comprising the sequential or simultaneous steps of:
   providing an electrolysis cell comprising:
      a cathodic compartment, the cathodic compartment comprising:
         a gas-diffusion cathode comprising a catalytic porous film for the reduction of oxygen to hydrogen peroxide,
         means for feeding oxygen, and
         a bottom part adapted to withdraw a solution of hydrogen peroxide of 1 to 5% by weight concentration;

an anodic compartment, the anodic compartment comprising:
an anode equipped with a catalyst for oxygen evolution, and
means for feeding an aqueous anolyte; and
a membrane subdividing the cell into the cathodic compartment and the anodic compartment, the membrane being provided with a first surface facing the cathodic compartment and a second surface facing the anodic compartment;
feeding oxygen to the cathodic compartment;
feeding an aqueous anolyte to the anodic compartment; and
applying an electric current to the cell while establishing a water flow-rate of 10 to 100 l/h·m2 across the membrane.

12. The process of claim 11, the cell comprising the cell of claim 1.

13. The process of claim 11, the aqueous anolyte comprising deionised water.

14. The process of claim 11, the aqueous anolyte containing at least one electrolyte.

15. The process of claim 14, the at least one electrolyte comprising one or more of sulphuric, phosphoric, perchloric and acetic acid, their sodium and potassium salts, sodium, potassium and lithium hydroxides and potassium carbonate.

16. The process of claim 11, further comprising setting the temperature of the anolyte feed at a value not higher than 50° C.

17. The process of claim 16, the temperature set of the anolyte feed is carried out by means of a heat exchanger.

18. The process of claim 11, the anolyte added with at least one hydrogen peroxide stabilising agent.

19. The process of claim 18, the at least one hydrogen peroxide stabilising agent comprising one or more of sodium pyrophosphate, colloidal tin oxide, alkaline silicates, chelating compounds and salts of ethylendiaminotetraacetic acid.

20. The process of claim 11, the oxygen feed to the cathodic compartment comprising a recycle of oxygen generated on the anode of the anodic compartment mixed with an at least equal amount of oxygen coming from an external source.

21. The process of claim 20 wherein the external source is ambient air.

* * * * *